United States Patent [19]

Bennett et al.

[11] 4,329,021
[45] May 11, 1982

[54] PASSIVE SOLAR LIGHTING SYSTEM

[75] Inventors: David J. Bennett, Minneapolis; David A. Eijadi, St. Paul, both of Minn.

[73] Assignee: Bather, Ringrose, Wolsfeld, Jarvis, Gardner, Inc., Minneapolis, Minn.

[21] Appl. No.: 140,853

[22] Filed: Apr. 16, 1980

[51] Int. Cl.³ .................. G02B 17/00; G02B 27/00
[52] U.S. Cl. ......................... 350/259; 126/440; 237/1 R
[58] Field of Search ........... 126/440; 350/258–265, 350/211; 237/1 R

[56] References Cited

U.S. PATENT DOCUMENTS

| | | | |
|---|---|---|---|
| 593,045 | 11/1897 | Cummings | 356/261 |
| 755,196 | 3/1904 | Wadsworth | 350/260 |
| 755,197 | 3/1904 | Wadsworth | 350/260 |
| 1,101,001 | 6/1914 | Willsie | 84/69 |
| 1,130,871 | 3/1915 | Willsie | 126/422 |
| 3,125,091 | 3/1964 | Sleeper, Jr. | 126/426 |
| 3,915,148 | 10/1975 | Fletcher et al. | 126/422 |
| 4,056,094 | 11/1977 | Rosenberg | 126/440 |
| 4,069,812 | 1/1978 | O'Neill | 182/89 |
| 4,108,540 | 8/1978 | Anderson et al. | 312/8 |
| 4,116,223 | 9/1978 | Vasilantone | 126/135 |
| 4,124,017 | 11/1978 | Paull | |
| 4,147,561 | 4/1979 | Knight | |

OTHER PUBLICATIONS

"Lighting with Sunlight Using Sun Tracking Concentrators" Duguay and Edgar, *Applied Optics*, vol. 16, No. 5, May 1977, pp. 1444–1446.

"Transmission of 3-D Images by Means of Lens Guides", Duguay and Aumiller, *Applied Optics*, vol. 18, No. 12, Jun. 15, 1979, pp. 2081–2084.

"Solar Electricity: The Hybrid System Approach", Duguay, *American Scientist*, vol. 65, Jul.–Aug. 1977, No. 4, pp. 422–427.

*Primary Examiner*—Richard A. Wintercorn
*Attorney, Agent, or Firm*—Merchant, Gould, Smith, Edell, Welter & Schmidt

[57] ABSTRACT

A passive solar lighting system is disclosed. A multiplyer lens (20) located within an aperture (12) in a building (10) increases the cone of light acceptance which would result in the absence of lens (20). Light passing through lens (20) is further refracted by lenses (22, 24) and the resultant light is thereby directed to a target area (14) for interior lighting.

9 Claims, 10 Drawing Figures

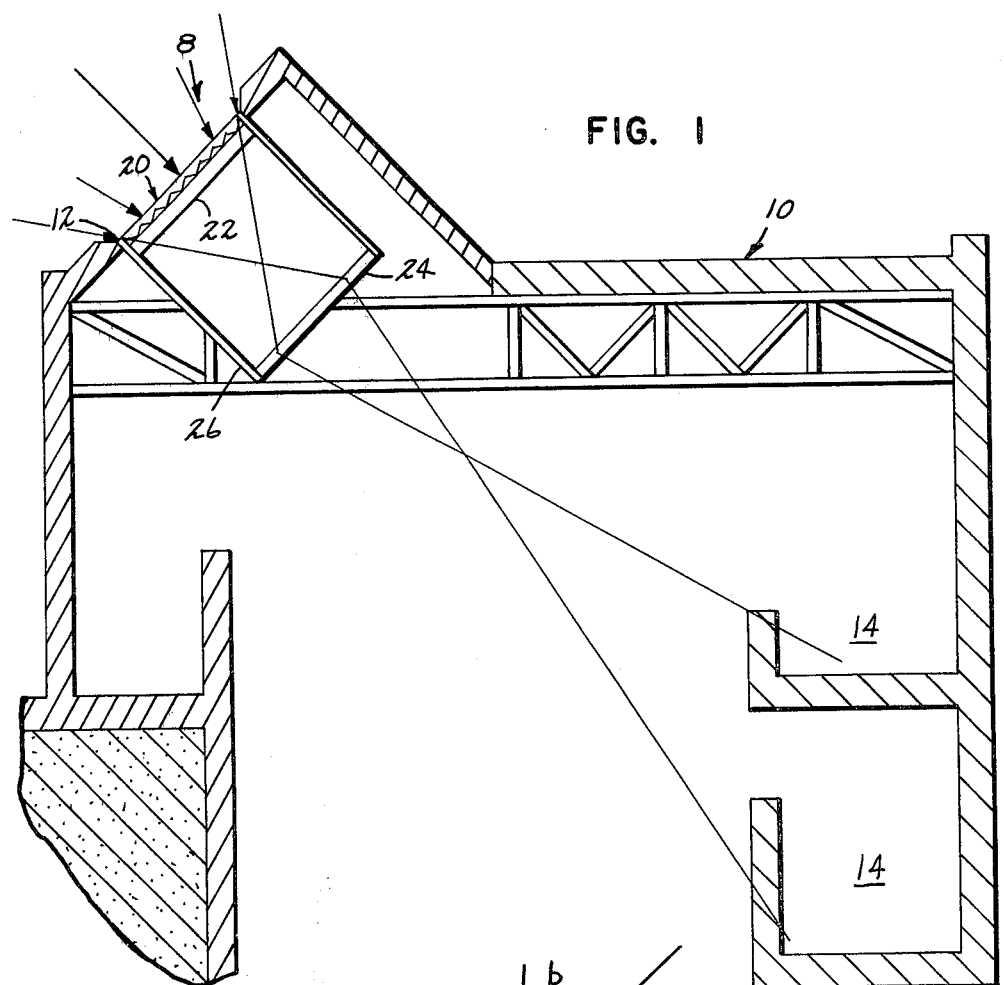
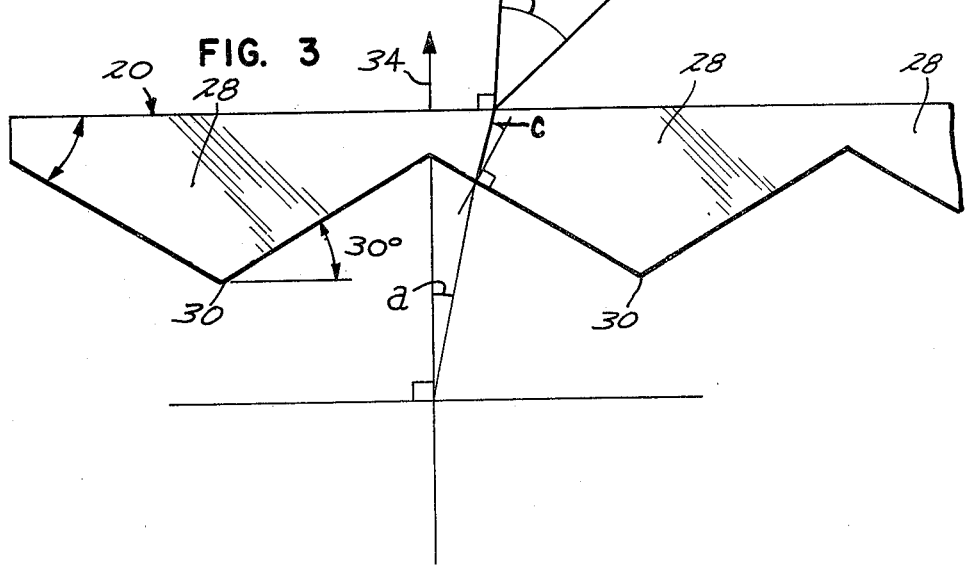

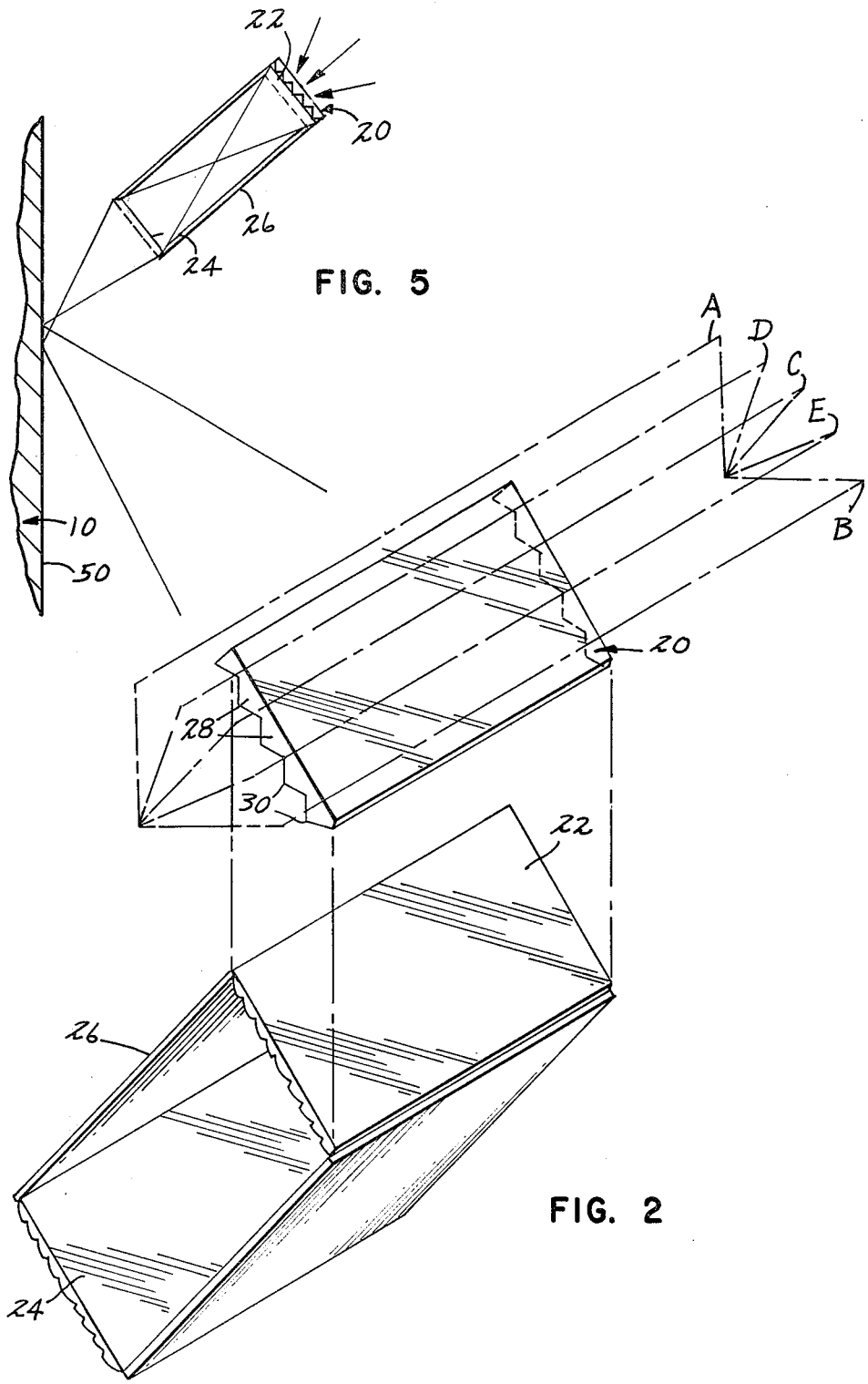

U.S. Patent May 11, 1982 Sheet 4 of 4 4,329,021
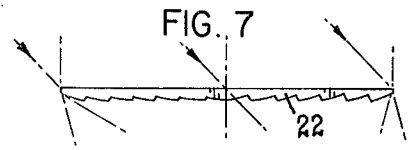
FIG. 8
FIG. 7
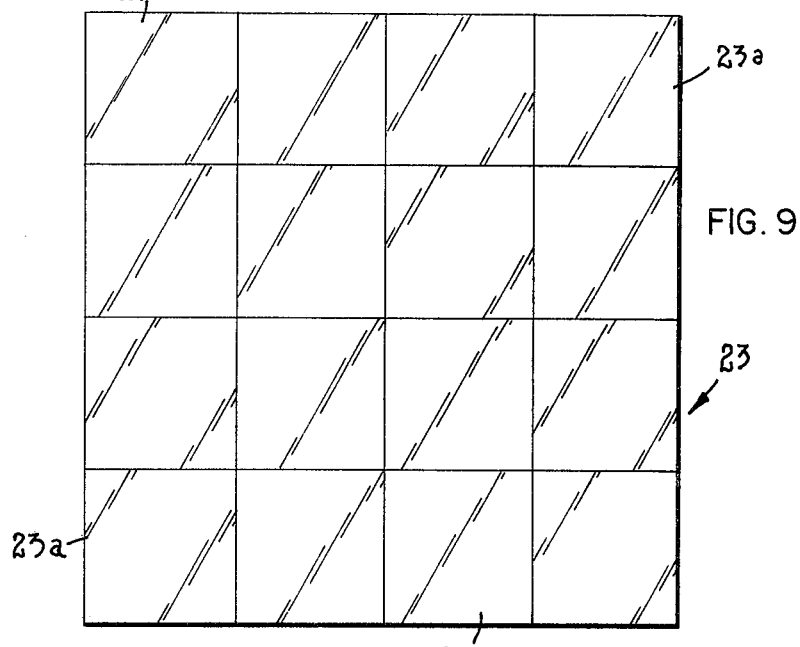
FIG. 9
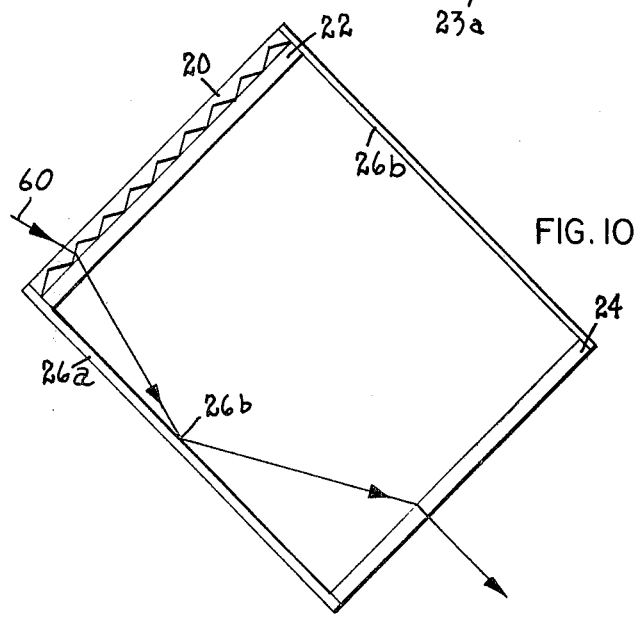
FIG. 10

PASSIVE SOLAR LIGHTING SYSTEM

TECHNICAL FIELD

The present invention relates to the field of interior lighting provided by sunlight, more particularly systems which capture solar radiation passively without requiring mechanical systems for tracking the movement of the sun.

BACKGROUND OF THE INVENTION

With increasing interest in fuel conservation, the idea of employing sunlight for interior lighting has again become popular. While sunlight provides an inexpensive source of interior lighting, it has been difficult to manipulate this light so that a building interior will be provided with adequate light throughout the course of the day. Because the position of the sun in the sky is constantly changing throughout the day and through the different seasons, a means must be provided for capturing these rays regardless of their orientation on the horizon. Numerous schemes have been developed for tracking the path of the sun which required complex electro-mechanical tracking mechanisms. One such "active" scheme is disclosed in an article by M. Duguay and R. Edgar entitled "Lighting with sunlight using sun tracking concentrators" *Applied Optics,* volume 16 page 1444, May 1977, which employs an active tracking system. The disadvantage of such systems is that they are more costly to construct thereby reducing the economic advantage of solar lighting and discouraging its implementation in residential construction where sophisticated systems are too expensive and otherwise undesirable.

Current non-moving or "passive" solar collecting methods of admitting sun into an interior space are generally limited to glazing at the building envelope. Skylights and windows are very old techniques. The addition if frosted glass or plastic material used to scatter light has also been combined with these previous techniques to somewhat improve the effectiveness of prior passive methods but does not meet the need of providing sufficient light in the desired area throughout the daylight hours.

The present invention has overcome the deficiencies of the prior art by providing a passive means for increasing the angle at which incident light is accepted into a collector without physically tracking the movement of the sun.

SUMMARY OF THE INVENTION

The present invention is directed to a passive solar lighting system for use in lighting the interior of a building having a light transmissive aperture therein, which includes a means located near the aperture capable of increasing the angle of incidence which sunlight may enter aperture beyond what would enter in the absence of this means, and a plurality of focusing lenses in line with the increasing means for focusing the light transmitted through the aperture to a desired surface within the building to provide usable light for persons within areas of the building.

According to a further aspect of this invention, the means for increasing the incident angle of light accepted includes a longitudinal multiplier lens also known as a prismatic refractor, which is oriented in a east-west direction so as to maximize the light collected regardless of location of the sun through the various seasons.

According to another aspect of this invention, the means for increasing the incident angle of light may include a longitudinal multiplier lens oriented in a north-south direction so as to maximize the light collected regardless of the location of the sun throughout a given day.

According to another aspect of the invention, a plurality of lenses, such as Fresnel or ground lenses are located in line with the multiplier lens for adjusting the focus of the light onto a target surface to the degree of light concentration desired.

According to a further aspect of this invention, plastic lenses could be used throughout so as to significantly reduce the cost of this lighting system.

According to a further aspect of the invention, lenses of the invention are held by a frame which has mirrored surfaces to increase the amount of light reaching the target surface.

Various advantages and features of novelty which characterize the invention are pointed out with particularity in the claims annexed hereto and forming hereof. However, for a better understanding of the invention, its advantages, and objects obtained by its use, reference should be had to the drawings which form a further part hereof, and to the accompanying descriptive matter, in which there are illustrated and described preferred embodiments of the invention.

DETAILED DESCRIPTION OF THE DRAWINGS

Referring to the drawings wherein like numerals indicate like elements:

FIG. 1 is a view in section of the present invention installed within a building;

FIG. 2 is an exploded perspective view with portions broken away illustrating the lens portion of the present invention;

FIG. 3 is a fragmentary end view of the multiplier lens of FIG. 2;

FIG. 5 is a schematic view of an alternative embodiment of the present invention employing a mirror;

FIG. 7 is a side view in section of lens 22 of the present invention;

FIG. 8 is a side view in section with portions broken away of lens 23a of an alternate embodiment of the present invention;

FIG. 9 is a top plan view of lens 23 of an alternate embodiment of the present invention; and FIG. 10 is a side view in section of a portion of an alternate embodiment of the present invention.

DETAILED DESCRIPTION OF THE INVENTION

Figure 4:
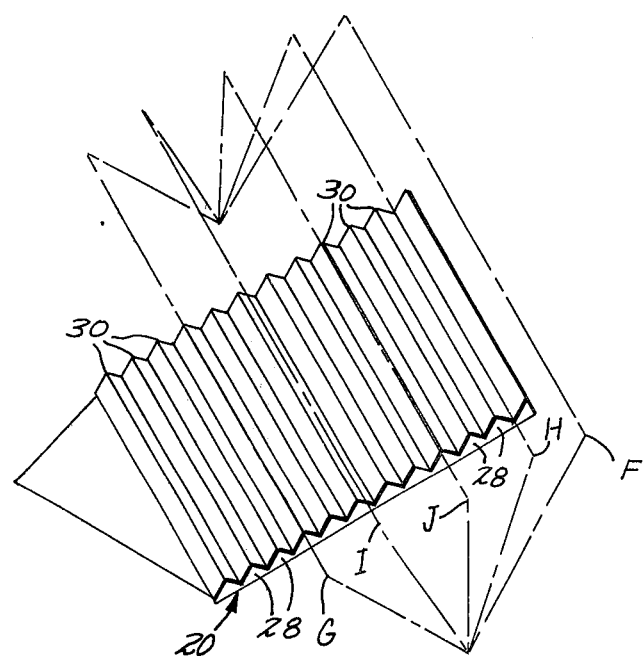
FIG. 4 is an alternate embodiment of a portion of the present invention.

Referring to the drawings in detail, there is shown in FIG. 1 a passive solar lighting system 8 located within building 10 having a light transmissive aperture 12 therein and a target surface 14 within the building where interior illumination is required. Located across aperture 12 is multiplier lens 20. Directly behind multiplier lens and in intimate contact therewith is lens 22. Alternatively, lens 22 may be spaced from lens 20 if desired. Located in line with lens 22 and spaced therefrom is lens 24. Lenses 20, 22 and 24 are carried within frame 26 which holds them in place and affixed to building 10.

Figure 6:
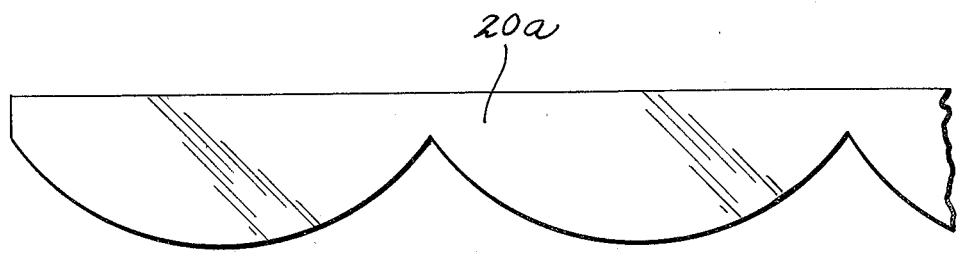
FIG. 6 is a view similar to FIG. 3 showing an alternate embodiment of the multiplier lens.

Turning to FIGS. 2 and 3 of the drawings, lenses 20-24 can be seen in greater detail. Multiplier lens 20, also known as a prismatic refractor, is comprised of a plurality of longitudinal prisms 28 in a side-by-side relationship. In actual practice, lens 20 may be stamped out of a single sheet of plastic so that it has a plurality of ridges 30 which have a prismatic or refractive effect. This lens may be composed of any translucent material although plastic may be desirable to reduce the cost of production. Alternatively, a plurality of cylindrical lenses may be formed in a single sheet in a side by side relationship to produce a multiplier lens 20a as shown in FIG. 6. Such a cylindrical lens would have essentially the same refractive effect as the prisms 28 of multiplier lens 20.

Multiplier lens 20 is optimally oriented so that the prisms 28 are longitudinally aligned in an east-west direction. This orientation permits capture of a maximal amount of sunlight regardless of the season of the year without the need for mechanical tracking systems; hence, the term "passive" or "static" system. The orientation of lens 20 in terms of its inclination with respect to a horizontal plane is dependent on the geographic latitude at the location of use and can be determined by a person skilled in the art. For example, it has been determined for a building in Minneapolis, Minn. an inclination of 45° off the south horizon has proved satisfactory. The inclination can also be adjusted slightly at installation to favor winter over summer or vice versa. The physics of this orientation for use in a focusing type of solar heating system is described in detail in U.S. Pat. No. 3,915,148 issued to Fletcher et al which is hereby incorporated by reference.

It is similarly possible to orient lens 20 so that the prisms 28 are longitudinally aligned in the north-south orientation as shown in FIG. 4. This arrangement broadens the cone of acceptance of the multiplier lens in an east-west direction so that a maximum capture of light occurs for the longest number of hours in a day. A trade-off between these two orientations result in that one orientation (east-west) improves seasonal light capture at the cost of reducing the length of hours in a day which light will be captured while the other orientation (north-south) favors optimumization of the number of hours of daylight captured at the expense of capture during certain seasons.

At a latitude of 45° north the winter solstice occurs at about 22° off the horizon and the summer solstice occurs at about 67°. As shown in FIG. 2, phantom lines A and B define planes which indicate breadth of a typical cone of acceptance for a multiplier lens. Phantom line C depicts a plane located normal to the face of multiplier lens 20. Phantom lines D and E indicate planes which illustrate what a normal cone of acceptance might be for an aperture without multiplier lens 20. It can be appreciated that the present invention, as oriented in FIG. 2, provides substantially more light capture through the various seasons than would be possible without this device. During a given day in a season when the sun travels essentially through a plane below plane E, sunlight would not be gathered by the system 8 without the use of multiplier lens 20.

By orienting multiplier lens 20 as shown in FIG. 4 so that the individual prisms are aligned in a north-south direction, a cone of acceptance delineated by phantom lines F and G illustrates the increased light capture in a given day over what would be the normal cone of acceptance without multiplier lens 20, as indicated by phantom lines H and I. Plane J is depicted normal to lens 20. In FIG. 4, lens 20 is shown oriented so that longitudinal prisms 28 are facing outward toward the sun, the reverse of that shown in FIG. 2. Either orientation, inward or outward, is possible for the north-south and the east-west orientation of the lens 20.

The multiplier lens 20 acts as a passive solar tracking device for the entire lens guide system which includes lenses 22 and 24, by broadening the acceptance cone of the system, thus allowing it to "see" more of the sun's path without the need to physically re-orient the system. When used in combination, the multiplier lens 20 and guide system simulates an active solar lighting system.

Each facet of the multiplier lens refracts the sun's rays according to the angle of incidence at which the rays strike lens 20. A simple multiplier lens can be made from a plurality of linear plastic prisms of triangular cross section in side-by-side relationship manufactured so that there are many to a sheet. Cylindrical lenses may be substituted for prisms as shown in FIG. 6. Small pyramids can also be stamped or cast into a plastic sheet to act as a multiplier lens.

Turning to FIG. 3 of the drawings, the refractive effect of the multiplier lens is shown. To compare the increase in the cone of acceptance achieved by the multiplier lens 20, a calculation can be made of the normal cone of acceptance which would be available should multiplier lens 20 be eliminated from the scheme. The normal cone of acceptance ($2a$) is determined by the following formula:

$$2a = 2\tan^{-1}(D_{24}/2 \cdot L)$$

where $D_{24}$ = diameter of lens 24 and L = distance between lens 22 and lens 24

If, for example, the diameter of lens 24 was two units ($D_{24}=2$) and the distance between the lens 22 and the lens 24 was three units ($L=3$), then by making the appropriate calculation, the cone of acceptance of such a system would be approximately 37° or 18.5° to the left or right of the normal axis 34 as shown in FIG. 3.

Since multiplier lens 20 obeys the physical laws applicable to any other refracting lens, the light bending effect of this lens can be calculated in order to design a multiplier lens capable of producing the desired cone of acceptance. By altering the "steepness" of pitch of the facets of the individual prisms in multiplier lens 20, the refractive effect is similarly altered. The pitch in the lens shown in FIG. 3 is designated as 30°. With this angle known and the index of refraction for the material of which the multiplier lens is made, it is possible to calculate the maximum angle which light can be refracted by lens 20 and still be transmitted through the multiplier lens to lens 24. This maximum angle of incidence is noted as angle b in FIG. 3 and represents half of the cone of acceptance since the cone includes the light received from both left and right sides of an axis normal to the surface of lens 20. By using the formula hereinafter described, angles "c" and "a" may be calculated as shown in FIG. 3.

It is also possible to work in the other direction, i.e., start with an angle "a" (the maximum angle of incidence which could be captured by a system without lens 20, as computed by the formula above). A third alternative is to determine angle "a" by the geometry of system according to the factors in the above formula, choose the desired cone of acceptance, and calculate the prism geometry or pitch necessary.

The following formula and calculations were based on a multiplier lens with 30° prisms having an index of refraction of 1.49 and an angle "a" determined to be 18.5°:

$$N_1 \sin I_1 = N_2 \sin I_2,$$

the general formula, or as derived using the 30° prisms of lens 20:

$$\arc \sin [\sin (30° - a)/N_2] = c \text{ and}$$

$$\arc \sin [\sin (30° - c) \cdot N_2] = b$$

where
a = as calculated in previous formula
$N_2$ = Index of refraction = 1.49 for glass angles a, b, and c are shown in FIG. 3
2b = cone of acceptance with multiplier
In this case:

$$\arc \sin [\sin (30° - 18.5°)/1.49] = 7.7° = c$$

and substituting where:

$$\arc \sin [\sin (30° - 7.7°) - 1.49] = 34° = b$$

angle a = as defined above
angle b = maximum angle of incidence off the normal axis for a particular multiplier lens as calculated above
angle c = angle at which light entering prism at angle b will appear off an axis normal to an inclined face of the prism as discussed above From the above calculations, it can be seen that multiplier lens 20 having 30° prisms increases the angle of acceptance from 18.5° to 34°, thereby permitting the capture of sunlight over a greater portion of the horizon without physically tracking the movement of the sun.

Therefore, 2b = 68° or an increase of 31° in the cone of acceptance without the need to physically re-orient any element of the system.

Lenses 22 and 24 serve to guide light transmitted through multiplier lens 20 to a target surface 14 at any degree of focus desired. Lenses 22 and 24 may be made of any material which is light transmissive. In the preferred embodiment, plastic Fresnel lenses are chosen since they are easily made by a stamping process from plastic sheets. In a preferred embodiment, linear echelon Fresnel refractors are employed. Lens 22 is located in intimate contact with lens 20. Light passing through lens 22 will converge at its focal length. The distance relationship between the target 14 and lenses 22 and 24 are governed by the following equation:

$$1/S_1 - 1/S_2 = 1/f$$

where
$S_1$ = Distance from lens 22 to lens 24
$S_2$ = Distance from lens 24 to target 14
$1/f$ = focal distance of lens 24.

By locating lens 22 directly adjacent lens 20, it is possible to capture nearly all of the light rays passing through lens 20 for further refraction and guidance by lens 22. The focal length of lens 22 is usually available with specifications included from the vendor of such lenses. It is desirable to locate lens 24 such that all of the light passing through lens 22 falls within the cone of acceptance of lenses 22 and 24. It is possible to focus the light rays from lens 22 directly on lens 24; however, this is inadvisable since the heat generated may cause damage to lens 24 if lens 24 is made of plastic. Lens 24 can be located so that lens 22 focuses either beyond or before lens 24 since the desire of this system is to deliver light and not an image of great clarity. By adjusting the position of either lens 22, lens 24 or both, it is possible to obtain the degree of light intensity and amount of light spread which is desired for target 14. Obviously, when the area which must be illuminated is increased, the intensity is similarly decreased.

An alternative embodiment of this invention is shown in FIG. 5. This embodiment includes all of the elements of previous embodiments but in addition employs a mirror 50 which is mounted on a wall of building 10. The placement of this mirror acts as an additional light guide and permits the light rays to be directed to a target elsewhere within the building. It is within the scope of this invention that additional mirrors and/or lenses could be located to further direct the light rays.

Lenses 22 and 24 are held within a frame 26 which can be a simple bracket means to hold the lenses in place. It is also possible to use technology known in optical telescopes for holding focusing lenses which are movable relative to one another to change the area upon which the light through the system is focused. Once the location of lens 22 and 24 are determined for a particular area to be illuminated, there is no need to readjust their relative position and therefore the frame and lenses can be fixed.

Where space limitations are a problem, it may be important to reduce the focal length of lenses 20 and 24 so as to reduce the overall size of the system. This may be particularly important with buildings having lower ceilings. This can be accomplished by simply choosing lenses of shorter focal length; however, since focal length is related to the diameter of the lens, lenses used in this system, which may be two feet square, inherently have long focal lengths. To overcome this problem, lens 23 may be substituted in place of lens 22, lens 24 or both. Lens 23 shown in FIG. 9 comprises a plurality of smaller lenses 23a shown in FIG. 8, which are joined together to form a single sheet lens. Individual lenses 23a are preferably plastic Fresnel lenses and are structurally the same as lenses 22 and 24. FIG. 7 illustrates a side view of lens 22 and it can be seen that each lens 23a is merely a reduced version thereof. Lens 23 can be produced on a single sheet in a stamping operation whereby all lenses 23a are formed simultaneously on the same sheet of plastic. Because each lens 23a has a substantially smaller diameter than lenses 22 or 24, lens 23a necessarily has a much shorter focal length. Even though lens 23 overall has the same surface area as lens 22 or 24, the focal length is actually determined by the individual lenses. It is therefore possible to space lenses 22 and 24 much closer to each other.

It is also possible to make certain modifications to frame 26 to increase the amount of light directed to target 14. As shown in FIG. 10, frame 26 has been replaced by frame 26a wherein all four walls of said frame are coated with a metallic or reflective material such that they are mirrored. This will result in increased light transmission to target 14 for the following reason. Some of the light passing through lenses 20 and 22 will strike the lens holding frame 26. If the frame has mirrored surfaces 26b as does frame 26a, light rays such as ray 60 will be reflected off surfaces 26b and be directed through lens 24, ultimately striking target 14. Frame 26, lacking this reflective ability, would simply absorb ray 60 and therefore the light transmitted to target 14 would be somewhat diminished. The walls of the frame 26 may be either linear or in the form of a single curvilinear wall.

Numerous characteristics and advantages of the invention have been set forth in the foregoing description, together with the details of structure and function of the invention, and the novel features thereof are pointed out in the appended claims. The disclosure, however, is illustrative only, and changes may be made in detail, especially in matters of shape, size, and arrangement of parts, within the principles of the invention, to the full extent intended by the broad general meaning of the terms in which the appended claims are expressed.

What is claimed is:

1. A passive solar lighting system for use in lighting the interior of a building having a light aperture comprising in combination:
   (a) passive means adapted to be located at a fixed location adjacent an aperture through a building for increasing the angle of light acceptance through which sunlight may enter the aperture;
   (b) focusing means located in line with said passive increasing means for receiving light transmitted by said passive increasing means and further transmitting and directing said light to a desired target area within the building; and
   (c) means for holding said focusing means optically in line with said passive increasing means to receive light therefrom, said holding means including a frame having sidewalls substantially orthoginal to said focusing and passive means, said sidewalls being reflective so that an increased amount of light will pass through said focusing means.

2. A system according to claim 1 wherein at least one of said focusing lenses comprises a plurality of coplanar lenses.

3. A system according to claim 2 wherein said coplanar lenses are Fresnel lenses produced on a single sheet of material.

4. A system according to claim 1 wherein said focusing means includes a plurality of lenses.

5. A system according to claim 1, 2, 3, or 4 wherein said passive means includes a multiplier lens.

6. A passive solar lighting system for use in lighting the interior of a building having a light aperture comprising in combination:
   (a) a multiplier lens having a plurality of longitudinal prisms arranged in a side-by-side relationship fixedly located in line with the aperture for increasing the cone of acceptance for light entering the building through the aperture;
   (b) a first refracting lens located in line with said prisms for receiving light transmitted through said prisms and focusing said light;
   (c) a second refracting lens located to receive light passing through said first lens and direct said light to a target area within the building; and
   (d) at least one frame for fixedly securing said multiplier, first and second lenses to the building, said frame having mirrored sidewalls positioned substantially orthogonally to said lenses.

7. A system according to claim 6 wherein a mirror is employed to direct light passing through said second lens to a target surface.

8. A system according to claim 6 wherein said multiplier lens is comprised of a plastic sheet wherein said prisms are formed in one surface thereof and said first and second refracting lenses are each formed of a plastic sheet Fresnel lens.

9. A system according to claim 6 wherein at least one of said first and second refracting lenses is comprised of a plurality of coplanar Fresnel lenses produced on a single sheet of material.

* * * * *